US012228639B2

United States Patent
Ruchti et al.

(10) Patent No.: US 12,228,639 B2
(45) Date of Patent: Feb. 18, 2025

(54) METHOD, APPARATUS AND COMPUTER PROGRAM FOR ENABLING A SENSOR SYSTEM FOR DETECTING OBJECTS IN AN ENVIRONMENT OF A VEHICLE

(71) Applicant: ZF Friedrichshafen AG, Friedrichshafen (DE)

(72) Inventors: Martin Ruchti, Langenargen (DE); Thomas Nägele, Friedrichshafen (DE); Stefan Rinkenauer, Markdorf (DE); Jens Klimke, Friedrichshafen (DE); Tobias Moers, Friedrichshafen (DE); Dominik Raudszus, Friedrichshafen (DE); Hendrik Weber, Friedrichshafen (DE); Maike Scholtes, Friedrichshafen (DE); Lutz Eckstein, Aachen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 17/775,048

(22) PCT Filed: Nov. 6, 2020

(86) PCT No.: PCT/EP2020/081301
§ 371 (c)(1),
(2) Date: May 6, 2022

(87) PCT Pub. No.: WO2021/089787
PCT Pub. Date: May 14, 2021

(65) Prior Publication Data
US 2022/0390596 A1    Dec. 8, 2022

(30) Foreign Application Priority Data
Nov. 8, 2019 (DE) .................. 10 2019 217 257.1

(51) Int. Cl.
*G01S 13/931* (2020.01)
*G01S 13/86* (2006.01)

(52) U.S. Cl.
CPC .......... *G01S 13/931* (2013.01); *G01S 13/865* (2013.01); *G01S 13/867* (2013.01)

(58) Field of Classification Search
CPC .... G01S 13/931; G01S 13/865; G01S 13/867; G01S 2013/93273; G01S 13/87; G01S 7/497; G01S 17/931; G01S 13/92
See application file for complete search history.

(56) References Cited

U.S. PATENT DOCUMENTS

| | | | |
|---|---|---|---|
| 2010/0042350 A1* | 2/2010 | de Wild | G01S 13/92 |
| | | | 702/96 |
| 2016/0084954 A1* | 3/2016 | Bilik | G01S 13/867 |
| | | | 342/55 |

(Continued)

FOREIGN PATENT DOCUMENTS

DE    102004052242 A1    6/2005

OTHER PUBLICATIONS

"Road Vehicles—Safety of the intended functionality"; ISO 21448; first edition; Jun. 2022; International Standards Organization (ISO); Geneva, Switzerland. (Year: 2022).*

(Continued)

*Primary Examiner* — Bernarr E Gregory
(74) *Attorney, Agent, or Firm* — Crowell & Moring LLP (57) ABSTRACT

A method for obtaining approval of a sensor system for detecting objects in a vehicle's environment includes providing a combined probability distribution for deviations between output data from a sensor system and reference data at the programming level for detecting objects by the sensor system, at the sensor level and/or at the fusion level, sampling deviation combinations and calculating occurrence (Continued)

probabilities for the sampled deviation combinations using the combined probability distribution, subjecting the reference data to the sampled deviation combinations, processing these reference data with a fusion unit, and obtaining fusion results, removing occurrence probabilities from the combined probability distribution from which those fusion results are obtained that satisfy a predefined condition, and obtaining a residual probability distribution, taking the integral of the residual probability distribution and obtaining an absolute error probability, and obtaining approval of the sensor system based on the absolute error probability.

13 Claims, 7 Drawing Sheets

(56) References Cited

U.S. PATENT DOCUMENTS

| | | | |
|---|---|---|---|
| 2016/0124076 A1* | 5/2016 | Nakatani | G01S 13/931 342/174 |
| 2019/0049958 A1* | 2/2019 | Liu | G01S 17/931 |
| 2020/0231142 A1* | 7/2020 | Liu | G01S 13/931 |
| 2020/0410788 A1* | 12/2020 | Uchiyama | G01S 17/931 |

OTHER PUBLICATIONS

"Safety in ADAS/ADS—SOTIF, a risk-based approach"; Tuv Sud; Munich, Germany; no author listed; copyright 2023. (Year: 2023).*
International Search Report and Written Opinion of the International Search Authority dated Jan. 22, 2021 in International Application No. PCT/EP2020/081301 (English and German Languages) (16 pages).
Meltz, Daniel et al. "Functional Safety Verification for Autonomous UGVs-Methodology Presentation and Implementation on a Full-Scale System" IEEE Transactions on Intelligent Vehicles, IEEE, vol. 4, No. 3, Sep. 1, 2019 (Sep. 1, 2019), pp. 472-485 (retrieved on Aug. 26, 2019) DOI: 10.1109/TIV.2019.2919460 ISSN: 2379-8858, XP011742977 (entire document).
Dutta Raj Gautam et al. "Quantifying trust in autonomous system under uncertainties" 2016 $29^{th}$ IEEE International System-On-Chip Conference (SOCC), IEEE, Sep. 6, 2016 (Sep. 6, 2016), pp. 362-367 DOI: 10.1109/SOCC.2016.7905511 XP033086820 (entire document).
J. Kapinski, "Simulation-Based Approaches for Verification of Embedded Control Systems: An Overview of Traditional and Advanced Modeling, Testing, and Verification Techniques" IEEE Control Systems, USA, vol. 36, No. 6, Dec. 1, 2016 (Dec. 1, 2016), pp. 45-64; DOI: 10.1109/MCS.2016.2602089; ISSN: 1066-033X, XP055763632 (entire document).
Kalra Nidhi, et al. "Driving to safety: How many miles of driving would it take to demonstrate autonomous vehicle reliability?" Transportation Research Part A: Policy and Practice. vol. 94, Sep. 10, 2016 (Sep. 10, 2016), pp. 182-193 DOI: 10.1016/J/TRA.2016.09.010; ISSN: 0965-8564, XP029815485 (entire document).

* cited by examiner

METHOD, APPARATUS AND COMPUTER PROGRAM FOR ENABLING A SENSOR SYSTEM FOR DETECTING OBJECTS IN AN ENVIRONMENT OF A VEHICLE

CROSS-REFERENCE TO RELATED APPLICATIONS

This application is a U.S. national stage application under 35 U.S.C. § 371 of PCT Application No. PCT/EP2020/081301, filed on Nov. 6, 2020, and published as WO 2021/089787 A1 on May 14, 2021, which claims priority from German Application No. DE 10 2019 217 257.1, filed on Nov. 8, 2019, the entirety of which are each hereby fully incorporated by reference herein.

The invention relates to a method, an apparatus and a computer program for obtaining approval for a sensor system for detecting objects in a vehicle's environment. The invention relates in particular to the approval with regard to systematic and statistical SOTIF risks. SOTIF stands for "Safety of Intended Functionality." The invention also relates to a sensor system for detecting objects in a vehicle's environment.

In order for a system to transition from the development phase to mass production it must be approved. It is first approved when the previously defined requirements, in particular those requirements relating to the safety of the technical system, can be satisfied by this technical system. Approval concepts currently used in the automotive industry result in approval for different automation levels in which a human driver can always assume control, either through direct control by the driver or at the back-up level, in which control is returned to the driver.

One aspect of autonomous driving is when the back-up level of returning control to the human driver is eliminated at certain automation levels, e.g. SAE level 3+. Safety is then obtained exclusively from the technical system comprising the driving robot and the vehicle. In "Autonomes Fahren—Technische, rechtliche and gesellschaftliche Aspekte" [EN: "Autonomous Driving—Technical, Legal, and Social Aspects"] published by Springer Vieweg, Wachenfeld and Winner state in their contribution, "Die Freigabe des autonomen Fahrens" [EN: "Approval of Autonomous Driving"] that, based on 3,375 fatal accidents recorded by the police in Germany in 2012, involving travel of 709 billion kilometers in Germany, there is an average of two fatal accidents for every 210 million kilometers driven. Based on a Poisson distribution and the requirement that autonomous vehicles should be twice as good as vehicles currently driven by humans, the autonomous vehicle must travel a testing distance of at least 2.1 billion kilometers. This would result in proof with a 50% probability. There would, however, be five accidents with this probability. Another statistical model that concerns the question of how many test kilometers an autonomous vehicle must travel in order to demonstrate that it is reliable in terms of safety and risk, is the RAND model, which can be accessed under www.jstor.org/stable/10.7249/j.ctt1btc0xw. The Rand model results in 8.8 billion test kilometers. Another model is the Minimal Endogenous Mortality (MEM) model for risk analysis of safety-relevant systems such as railroads or power plants. The MEM model delivers a mortality threshold of $10^{-9}$/hour for highway drivers.

It will be challenging to reach this extremely high number of safeguarding kilometers for obtaining approval. Moreover, there are no legal requirements for the approval of autonomous vehicles. As a result, it will not be possible to obtain approval for autonomous vehicles with the prior art in the foreseeable future. The prior art has no methods that can be used for approval and calculating the residual risk that can be expected for a system, even though these procedures are required in the SOTIF standard, ISO/PAS 21448:2019 "Road Vehicles—Safety of the Intended Functionality."

The statistical models known from the prior art relate to the overall system of an autonomous vehicle, and cannot be readily applied exclusively to perception, i.e. detection or awareness of objects in a vehicle's environment. The statistics do not allow for a limitation of accidents based on detection errors. It cannot be assumed that a detection error will not result in an accident. The research project PEGASUS (Project for Establishing Generally Accepted quality criteria, tools and methods as well as Scenarios And Situations for approval of highly automated driving functions), however, provides a comprehensive approach for safeguarding SAE J 3016 Level 3 systems. The scenario-based approach cannot be used for perception safeguarding, however, because of a lack of valid sensor models, and instead, can only be used for safeguarding decision making and planning algorithms for a driving strategy.

One object of the present invention is to reduce the number of safeguarding kilometers that must be travelled for the approval of a sensor system for detecting objects in a vehicle's environment.

The subject matter of the invention achieves this object by observing differing combinations of individual sensors in the sensor system and calculating an error probability. An existing residual risk in an autonomous vehicle is analyzed therewith. Further aspects of approval, e.g. functional tests, error reaction tests, and hardware tests, are included therein.

One aspect of the invention involves a method for obtaining approval of a sensor system for detecting objects in a vehicle's environment. The method comprises the following steps:

Providing a combined probability distribution for deviations between output data from the sensor system and reference data at the programming level for detecting objects by the sensor system, at the sensor level in the sensor system, and/or at the fusion level in the sensor system, Sampling deviation combinations and calculating occurrence probabilities for the sampled deviation combinations by means of the combined probability distribution, Subjecting the reference data to the sampled deviation combinations, processing these reference data with a fusion unit in the sensor system, and obtaining fusion results, Removing those occurrence probabilities from the combined probability distribution from which those fusion results are obtained that satisfy a predefined condition, and obtaining a residual probability distribution, Taking the integral of the residual probability distribution and obtaining an absolute error probability, and Obtaining approval of the sensor system on the basis of the absolute error probability.

The method according to the invention is implemented by a computer according to one aspect of the invention.

According to another aspect of the invention, there is an apparatus for obtaining approval of a sensor system for detecting objects in a vehicle's environment. The apparatus comprises at least one processor that is configured to execute the steps of the method according to the invention. The processor is a hardware unit according to one aspect of the invention, e.g. a computer or a part thereof, forming a control unit for the vehicle. The processor is also configured to combine data output by individual sensors in the sensor system.

According to another aspect of the invention, there is a sensor system for detecting objects in a vehicle's environment. The sensor system comprises numerous sensors using a specific technology, or at least one sensor for each technology, an apparatus according to the invention, and a fusion unit that combines data.

According to another aspect of the invention, there is a computer program for approving a sensor system for detecting objects in a vehicle's environment. The computer program comprises commands with which the processor executes the steps of the method according to the invention when the program is executed by the processor. The commands are written in a programming language, e.g. an object-oriented programming language, such as C++. According to one aspect of the invention, the computer program is executed by the processor in the apparatus according to the invention.

According to another aspect of the invention, there is a computer-readable data medium on which the computer program according to the invention is stored. The data medium can be a semiconductor memory in the form of a memory module, e.g. a memory card. The semiconductor memory can be a flash memory. The data medium is connected to an input port for a control unit in the vehicle. Consequently, the control unit in the vehicle can execute the method.

According to another aspect of the invention, there is a vehicle. The vehicle comprises at least one sensor system according to the invention, at least one control unit, and actuators, and the sensor system, the control unit, and the actuators are connected for signal transfer such that the vehicle is at least somewhat autonomous. The vehicle also comprises an interface for at least one reference system. The vehicle also comprises an apparatus according to the invention. An absolute error probability is obtained in accordance with the steps in the method according to the invention while the vehicle is underway, and this is then provided as feedback to a driving strategy for the vehicle. According to one aspect of the invention, feedback is provided to the driving strategy regarding the absolute error probability based on the state of the sensor system, the environment, and objects in the proximity of the vehicle. Limited autonomous driving means that the lateral and longitudinal movement is controlled by the autonomous vehicle, and it perceives the environment, but a human driver must react at a back-up level when asked to intervene. The vehicle can be a road vehicle. According to one aspect of the invention, the vehicle is an automated people mover.

Another aspect of the invention is a data medium signal with which the computer program according to the invention is transferred. By way of example, the computer program is stored in a data base, e.g. a cloud memory. An entire fleet of vehicles can be accessed with the data medium signal in order to validate the sensor systems in individual vehicles. The computer program according to the invention is transferred from the cloud memory to the control units in the vehicles in the fleet by means of the data medium signal for this, and the method according to the invention is then executed. The control units comprise means for accessing a network according on one aspect of the invention, e.g. a transmission control protocol (TCP) or an internet protocol (IP) network stack. As a result, a larger testing base is obtained, because data can be used from every vehicle in a fleet.

Further aspects of the invention can be derived from the dependent claims, the drawings, and the descriptions of preferred exemplary embodiments.

The sensor system, also referred to as an environment detection system, is a system for detecting environment and/or vehicle status values. The sensor system is an ADAS or AD sensor system. ADAS stands for Advanced Driver Assistance System, which is a driver assistance system that contains additional devices for assisting drivers in certain driving situations. AD stands for Autonomous Driving. The sensor system comprises numerous sensors of a specific technology, or at least one sensor for each technology. The numerous sensors result in a redundant sensor system. Sensor technologies can be optical technologies, for example. These optical sensors comprise imaging sensors in the visible light or infrared spectrums, camera systems with imaging sensors, e.g. mono, stereo and 3D cameras, or light time-of-flight sensors such as lidar sensors or lidar systems. Radar technology is another sensor technology that comprises radar sensors and radar systems. Another sensor technology is based on airborne and/or structure-borne sound. Sensors having these sensor technologies comprise ultrasonic sensors and microphones. The sensors measure the positions of objects in a three dimensional grid, comprising the elevation, azimuth angle, and distance of an object to a sensor reference point, or the speed vectors of objects. The measurements by the individual sensors are output as object lists within the program, which are processed by the sensor hardware, wherein the sensor is a system-on-a-chip (SoC) in this case. The program sections are parts of a feature extraction algorithm, for example. The sensor system also comprises a fusion unit, e.g. a computer platform that comprises processors, e.g. CPUs and/or GPUs. The computer platform executes programs, e.g. fusion algorithms, which then generate combined object lists from the object lists of the individual sensors. The sensor system is a real sensor system for use in street traffic. The output data from the sensor system are real test data, i.e. data recorded in a field study. Sensor models and/or models of sensor systems are also validated using the method according to the invention. Sensor models illustrate a sensor in a virtual test environment. A sensor model describes and/or simulates the interaction between a sensor and the virtual test environment.

The reference data are obtained by means of a reference sensor system. The reference sensor system checks or validates the output data from the sensor system. The reference sensor system is also a sensor system located on the vehicle. The reference data can also be simulated based on synthetic sensor situations within defined parameters. The reference data are output data from individual sensors in the reference sensor system, or fusion results from the reference sensor system. The sensors in the reference sensor system are high resolution sensors, wherein the reference system comprises a VELODYNE HDL-64E lidar sensor, by way of example.

The deviations comprise existence errors, e.g. recognition errors. By way of example, an object may be detected by the sensor system even though there is no object in the reference data. Such an error is called a false positive error. Alternatively, an object may not be detected by the sensor system even though there is an object in the reference data. This error is referred to as a false negative error. The deviations also comprise classification errors. By way of example, the sensor system may detect a pedestrian, even though the object is actually a vehicle. There are also measurement errors in continuous and/or discreet measurement values. By way of example, the sensor system may erroneously determine that an object is at a distance x meters in the direction of travel, or that a street is y meters wide. These deviations, individually or cumulatively, can result in a critical error in the sensor system, e.g. an error that results in a SOTIF risk. The reliability of the functionality is endangered in the case of errors resulting in an unreasonable risk resulting from functional shortcomings or avoidable misuse by individuals. A SOTIF risk may exist, for example, if an object recognition algorithm identifies a person on a skateboard as a human being, but discards this possibility as an error because of the speed at which the person is moving. These deviations are validated according to the invention in order to justify approval of a sensor system by means of the absolute error probability. Consequently, the method according to the invention also provides a solution for validation of SOTIF. The deviations are evaluated using an evaluation logics unit. The evaluation logic unit comprises an IC, ASIC, or FPGA component, for example, or is implemented in the form of a program comprising software code. The program is executed, e.g., by a data reader, comprising the evaluation logics unit. The program receives the measurements by the sensors in the sensor system and the reference data as data input. The data output comprises the deviations.

The combined probability distribution, or joint probability, describes the statistical dependence of the deviations between the individual sensors. The combined probability distribution enables an evaluation of sensor systems in which deviations are not statistically independent. The combined probability distribution is obtained by means of modelling probability distributions for the deviations in the individual sensors in the sensor system. By way of example, the combined probability distribution is obtained using MathWorks®. The modelled probability distributions approximate the deviations in the individual sensors. The quality of the models with respect to the deviations that are observed is determined using "goodness of fit" (GoF) metrics, which are executed using computers, for example. GoF metrics comprise, e.g. $x^2$, Anderson Darling Test, Negative Log Likelihood, Bayesian Information Criterion, Akaike Information Criterion, Normalized Mean Squared Error, or Root Mean Squared Error. By way of example, the Normalized Root Mean Squared Error GoF is defined as follows:

$$GoF = 1 - \frac{\|x_{ref}(i) - x(i)\|}{\|x_{ref}(i) - \text{mean}(x_{ref}(i))\|}$$

where $x(i)$ is the value for the probability distribution, and $x_{ref}(i)$ is the model value.

The value of the GoF indicates how representative a model is in relation to data. If the value is low, the predictions of the model are less reliable. If the value is good, the predictions of the model can be trusted. The GoF therefore indicates how accurate the predictions of the model are with respect to the selections of the model parameters.

The probability of finding deviations in individual sensors, i.e. individual sensor errors, in field tests is higher than finding errors occurring simultaneously in numerous sensors. For this reason, deviations in individual sensors are detected in the field and combined to form combined deviations. When detecting a distance, for example, the combination comprises a deviation probability p % for a radar, a deviation probability q % for a camera, and a deviation probability r % for a lidar. The different types of deviations for individual sensors are also combined according to the invention, e.g. when a camera has a false positive, in which a vehicle is identified as a pedestrian, and the position of the pedestrian is erroneously determined to be x meters away in the direction of travel. By sampling deviation combinations and calculating their probabilities, critical fields are evaluated in a combined error space, even though these deviation combinations could only be observed individually in field tests, but never simultaneously. Unlike with data obtained from field tests, combined cases can be generated by sampling deviation combinations that rarely occur in field tests, sometimes as rarely as once in a billion operating hours.

The deviation combinations are sampled, for example, in that the deviations of individual sensors are sampled incrementally. According to one aspect of the invention, more samples are taken close to the mean deviation that at values further from the mean value. According to another aspect of the invention, uniform, or Markov-Chain-Monte-Carlo methods/algorithms are used in order to obtain random samples of the deviations. This type of sampling is used, for example, in order to ensure that the evaluation is optimized over the entire range of accumulated errors.

When the reference data are subjected to the sampled deviation combinations, the reference data, which form object lists, can be treated as vectors. The deviation combinations represent error vectors. The vectors for the reference data and the error vectors are then added together.

The fusion unit, also referred to as High-Level Object Fusion (HOF) executes a fusion algorithm. The fusion unit obtains low level features from individual sensors, for example. Low level features are points or edges, for example. The fusion unit generates high level features from these low level features. The fusion unit then combines the high level features from the individual sensors. The plausibility of individual sensors is obtained by this means. The fusion algorithm comprises commands, for example, that result in the fusion unit combining mean values for reference data from individual sensors. According to one aspect of the invention, the fusion unit also evaluates the temporal dependance of the fusion input.

The residual probability distribution is obtained in that a description is obtained from a requirement for the fusion results. The requirement may state, for example, that, "objects may only be positioned at a distance with +/−1% deviation," or "objects may only fail to be identified for a maximum of x cycles." The description states that, "the requirement is satisfied," or "the requirement is not satisfied." If the method according to the invention is implemented by a computer, these requirements and descriptions are obtained with commands, for example, for conditional instructions and branchings, e.g. if/else constructions. The combined probability distribution is filtered using the requirements and conditions.

The residual probability density is then integrated using known numerical methods on a computer, e.g. using trapezoid numerical integration:

$$\int_a^b dx\, f(x) \approx \frac{1}{2}\sum_{n=1}^{N}(x_{n+1} - x_n)[f(x_n) + f(x_{n+1})].$$

Confidence intervals are determined for the absolute error probability obtained in this manner. According to one aspect of the invention, confidence intervals are also defined for the distribution parameters of the individual sensor characteristics. The confidence is then propagated in the overall prediction. When the confidence is high, the model parameters can be reliably identified from the individual deviations. If the model parameters cannot be clearly identified from the deviations, the confidence is low. The convergence of the error probability is depicted using the confidence intervals. The convergence of the error probability indicates how many test kilometers still need to be travelled in order for the error probability to lie within a certain confidence interval. The sensor system is approved on the basis of the confidence interval and/or the convergence of the error probability. The confidence is necessary in order to be able to make a prediction regarding the performance and residual risk of the sensor system; otherwise, the prediction is unreliable.

The residual probability density corresponds to an accumulation of error ranges for the sensor system. A prediction regarding the residual risk associated with the system is obtained using the absolute error probability.

This prediction is then used offline as a legitimization of the basis for the test, e.g. with regard to the data and/or scenarios that were used. The prediction may state, for example, that the absolute error probability is low. Because it is not necessary to actually drive the 2 billion kilometers, or the equivalent thereof in driving hours, that are currently required in the reference sources, due to the examination of the individual errors, it is therefore possible to legitimize a smaller test base for approving an autonomous vehicle technology.

The evaluation of the residual risk in order to minimize the risk of the current system can be used in online testing, i.e. during actual drives by the vehicle. This takes place by providing the risk prediction as feedback to the driving strategy or safety strategy.

In aspect of the invention, some data is introduced in the method, i.e. output data from sensors, reference data, actual or synthetic, and a first prediction is obtained. The statistical prediction value is also extrapolated. A test plan can then be formulated by defining a target confidence level. This will result in significant cost reductions in the development of autonomous vehicles. Predictions regarding the statistical performance of the sensor system can first be obtained after actually driving a sufficient distance or for a sufficient period of time. The method provides the target confidence level. The extrapolation provides an advance estimation. If new data from field tests are incrementally (or continuously) supplied to the method, they can then be incorporated into the calculations. This will result in a more precise planning, because the extrapolation is then based on more data. Moreover, the statistical accuracy of the predictions regarding the system will increase as a result of the current confidence level. If the model exhibits no convergence, the modelling is insufficient or the approximation selections are insufficient. In these cases, the method is adjusted, and the calculations are repeated.

The evaluation of the data is subject to the imprecision of the reference values used for the analysis. In order to take this into account, this imprecision is calculated or estimated for all reference data and then assigned to the reference data in accordance with one aspect of the invention. The greatest level of precision that can be obtained for the overall sampling of the sensor system is then determined on the basis of this imprecision. By way of example, if the referenced sensor system is imprecise, the reference data of the reference sensor system will then correspond precisely to that of the sensor system. This will give the impression of a precision that does not exist in this case. By determining the imprecision of the reference system, the maximum precision is limited, and a greater level of precision will not be calculated in this example.

According to one design of the invention, the deviations between the output data from the sensor system and the reference data comprise deviations in distance measurements, weather-dependent deviations, or deviations dependent on the state of the vehicle. By way of example, the deviations in each of the sensors in the sensor system may be observed over distances. The deviations are observed in various scenarios, e.g. "target object brakes," or "stopping and going of an ego and/or other vehicle." Weather-dependent deviations also contain a residual risk that is dependent on the presence of precipitation, e.g. rain or snow, and its intensity. Deviations dependent on the state of the vehicle mean, for example, that the deviations are to be evaluated with respect to the speed of the vehicle, in order to obtain a residual risk based on the respective speed of the vehicle.

According to another embodiment of the invention, probability distribution is obtained for each sensor in the sensor system for the deviations of the sensors, and the deviation combinations are sampled by means of the individual probability distributions of the sensors. The probability distribution for the deviations of an individual sensor, also referred to as the deviation probability function, are obtained, for example, in that the deviations in distance measurements between this sensor and a reference sensor are clustered in intervals with and interval width of 1 meter. In other words, a two dimensional histogram is obtained. The histogram is based on a clustering of 1 meter intervals in the distance from the object to the ego vehicle. There is a histogram relating to the deviation between the reference data and the sensor data in each of these clusters. The result is a histogram. The dependence on the distance is modeled by this means. These clusters of data are used to fit the probability distribution to deviations of this sensor. Parametrical or non-parametrical distributions are used for this fitting.

By way of example, standard distributions are used. Standard distributions are parametrical distributions that have two parameters, specifically the mean value µ and the standard deviation σ:

$$f(x, \mu, 6^2) = \frac{1}{\sqrt{2\pi 6^2}} e^{-\frac{(x-\mu)^2}{26^2}}$$

According to another aspect of the invention, non-parametrical core distributions are used with a core function K and a bandwidth parameter h:

$$f_h(x) = \frac{1}{nh} \sum_{i=1}^{n} K\left(\frac{x - x_i}{h}\right)$$

The core function K is a non-negative, symmetrical or non-symmetrical, standardized function. A non-symmetrical function allows for a systematic displacement of the error space toward a positive deviation. By way of example, the core function K can be a Gaussian function or a beta distribution. The optimal bandwidth parameter h is determined using the AMISE algorithm or cross-validation methods. Multidimensional core functions are used for multidimensional applications.

The distributions are fitted by means of statistical bootstrapping, which takes place using a computer according to one aspect of the invention. Bootstrapping selects a finite number of random samples from a data set and analyzes the random sample in terms of the mean value μ or standard deviation 6 for each sample.

Artificial data regarding the deviations between the output data from the sensors in the sensor system and the reference data are generated using the probability distributions for the deviations of the individual sensors according to one aspect of the invention. The artificially generated data are added of the invention to real data regarding deviations and/or deviation combinations in predefined intervals according to one aspect. The method is carried out incrementally in relation to the amount of available data in one aspect of the invention, in that artificial data are added incrementally to the existing data. Trends in the method are analyzed in this manner, e.g. regarding how the convergence develops. The fitting is also analyzed in relation to the increasing amount of data. According to one aspect of the invention, the artificial data are used for an extrapolation.

According to another aspect of the invention, the probability distributions for the deviations of the individual sensors, the resulting combined probability distribution, and the implications thereof, e.g. the absolute error probability, are computed offline on a computer, or online in the vehicle. The method is implemented in software code for the online calculation, which is executed by hardware in a control unit in the vehicle.

According to another aspect of the invention, the combined probability distribution is provided in the form of a multidimensional standard distribution for deviations of the individual sensors in the sensor system. The multidimensional standard distribution is:

$$f(x, \mu, \Sigma) = \frac{1}{\sqrt{|\Sigma|(2\pi)^d}} e^{\left(-\frac{1}{2}(x-\mu)\Sigma^{-1}(x-\mu)'\right)}$$

with a covariance matrix $\Sigma$ for the output data from the sensors in the sensor system. The covariance matrix is the generalization of the variance of a one dimensional random variable.

According to another embodiment of the invention, the output data from the sensor system and the reference data are obtained while driving the vehicle. The reference data comprise reference data recorded by a reference sensor system and/or reference data generated by means of sensor models. The vehicles are driven for this on special test courses.

According to another aspect of the invention, the reference data are processed in "Model in the Loop," "Software in the Loop," or "Hardware in the Loop" simulations, or by means of surrogate models. The criticality with regard to identification errors is evaluated in this manner, and the system response of the sensor system to the deviation combination is then mapped. In Model in the Loop simulations, an embedded system is simulated in a loop along with a model of the environment. The Model in the Loop simulation is carried out, for example, in the development environment MATLAB. In a Hardware in the Loop simulation, an embedded system, e.g. the sensor system or the fusion unit, is connected via its input/output ports to a counterpart, a so-called HiL simulator. The HiL simulator synthesizes the actual environment. In the Software in the Loop simulation, no special hardware is used. The software model is simply translated into code that the target hardware understands. This code is executed, e.g. on a development computer, along with the simulated model, instead of running on the target hardware, as is the case with the Hardware in the Loop simulation. The general terms, "Model, Software, Hardware in the Loop" belong to XiL methods. As a result, the system response by the sensor system corresponds to the deviation combination. Mathematical surrogate models are used for determining the system response in order to enable online realtime calculation. To enable calculation of the effects of reference data in realtime, surrogate models of the system response can be created from the data. These can then be used instead of the XiL in order to check the effects of the errors. The system can also be easily optimized using these surrogate models, because the response can be inverted.

According to another aspect of the invention, Bayesian inferences, with which an online and realtime inference can be obtained, are used to determine the system response. Alternatively, the reference data are processed using special control units with GPU support in order to calculate the system response. Highly simplified models such as N from K models, which only describe the system response in a very rudimentary manner, can also be used. These models are particularly helpful in conceptual preparatory developments and system optimizations in an early production phase.

According to another aspect of the invention, the fusion results are obtained using a redundancy in the sensor system. The redundancy results in a further reduction in safeguarding kilometers. If the sensor system comprises three sensors, the fusion result is formed by two of the sensors is one malfunctions. If two sensor malfunction, no fusion result is obtained.

According to another embodiment of the invention, deviations between the fusion results and the reference data are evaluated with a limit state function in order to removed occurrence probabilities from the probability distribution. The limit state function provides a first value when a requirement is satisfied, and a second value when the requirement is not satisfied. By way of example, the limit state function gives the value 0 when the requirement is satisfied, and the value 1 when it is not satisfied. According to one aspect of the invention, the limit state value is multidimensional. The overall statistical error range for the sensor system with regard to a residual risk is therefore evaluated by means of the limit state function.

According to another aspect of the invention, the amount of output data and reference data are increased incrementally. As a result, the calculation can be adjusted in steps.

For the purposes of an overview, the method and the apparatus that carries out the method shall be summarized below:

The method and apparatus are used in an autonomous vehicle that has data recording capabilities. The data recording takes place using the sensor system. Sufficiently accurate reference data must also be recorded with the reference sensor system parallel to this. The reference data are correlated temporally and spatially. These reference data can be recorded using another system attached to the vehicle, or by means of an external reference system.

The output data from the sensor system are then aligned with the reference data in a memory, e.g. a data base, cloud memory or memory card. Embodiments of the invention using cloud or computer clusters make it possible to process very large amounts of data. According to one aspect of the invention, the invention is carried out on a computer cluster. Deviations between the output from the autonomous system and the reference system are evaluated using an evaluation logic system, this being on the overall system level, i.e. using combined object lists, and on the level of individual sensors, i.e. object lists, detections, features from one or more sensors using the same technology, or from algorithm sections for generating object lists, detections and features.

The statistical distributions of individual aspects of the environment detection system are then analyzed and mathematically, numerically and technologically plotted on graphs. By this means, the probability distributions for the deviations of individual sensors in the sensor system are obtained. The plotting also includes the occurrence dependency between individual phenomena. The individual deviations are then spatially and/or temporally combined to form error images. This analysis results in the deviation combinations.

The criticality of the error images with regard to detection errors is then evaluated. There are various technological methods and systems for mapping the system response onto the error images. For this, perfect input data are subjected to temporal/spatial error vectors, and the system response is obtained by means of an appropriate residual system, i.e. a perception software or control unit. According to another aspect of the invention, the criticality is evaluated with regard to a system reaction, e.g. when a trajectory is erroneous, i.e. if the trajectory passes through a pedestrian. In this case, the residual system is a perception system or behavior software, for example. The selection of the method is based on the field of application in this case, e.g. offline or online. The invention comprises, for example:

Software in the Loop or Hardware in the Loop, wherein the actual environment detection software is used to depict the actual effects of the error on the system. This is preferably done in an offline mode.

Surrogate models, wherein the system response is mathematically approximated. This is preferably done online. Bayesian inferences with which an online and realtime inference is possible are also conceivable. Processing with special control units that have GPU support, on which the system response can be calculated, are also comprised in the invention.

The invention also comprises very simplified models such as N from K models, which only describe the system response in a very rudimentary manner. This are particularly useful in the conceptual preparatory development and for system optimization in early production phases.

A safeguarding effort is calculated initially and in a reiterative manner by the method. As a result, planning of ongoing operation and data recording are improved.

By analyzing the error images and their effects on the sensor system, the effects of individual error sources are more effectively analyzed. This results in a more specific and less expensive system that satisfies the requirements.

When exchanging sensors in a sensor system, the method and apparatus are used to estimate the effect thereof on the reliability of the system. If the data are statistically similar or better, and the effects of observed, individual deviations of the sensors do not worsen the sensor system and its residual risk, the sensor can be replaced.

Through reverse analysis of the error images, i.e. deviation combinations, the greatest error for the sensor system is determined using the method and the apparatus, thus improving the sensor system. This makes it easier to further develop the sensor system, and potentially reduce costs. Unlike with an entirely numerical analysis of the sensitivity with regard to the potential for improvement, an element of the system can be specified in this case, the improvement of which would result in the greatest benefit.

The online calculation results in an estimation of the current reliability. This requires a very effective calculation, because the prediction regarding reliability must take place in realtime. By way of example, the method makes use of Bayesian inference. This increase the technological reliability.

The method according to the invention is used to improve the validation and evaluation of subsystems in an autonomous vehicle according to one aspect of the invention, in order to create a model of the characterization of the detection system. The effects of the potential errors and their probabilities are used in this case for evaluating the residual risk in the autonomous vehicle. This use is very similar to a sensor model for virtual safeguarding.

To improve the efficiency with regard to data transport in the calculation, the method is carried out whenever new data are acquired in the data base. As a result, at least the first accessing of the data is no longer possible with a renewed accessing of the data. When the data are recalculated, a normal reading access must again be carried out.

An SAE J3016 level 3+ sensor system is approved of by the subject matter of the invention with a reduction in the safeguarding kilometers through the examination of deviation combinations in the calculation of malfunction probabilities and, according to one aspect of the invention, through the use of an at least partial redundancy in the sensor system. Furthermore, optimization of the sensor system in the development thereof is carried out efficiently by means of the subject matter of the invention.

In the drawings of exemplary embodiments illustrating the invention.

Identical reference symbols in the drawings indicate the same or functionally similar parts. For purposes of clarity, relevant reference parts are indicated in the respective figures. Distance measurements and deviations are given in meters in all of the figures.

Figure 1:
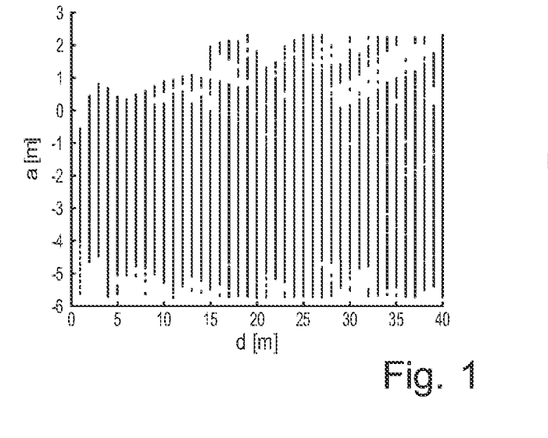
FIG. 1: shows a camera data clustering over distance.

The diagram in FIG. 1 shows the deviations a of a camera sensor over a distance d. The camera is a sensor 11 in a sensor system 10, see FIG. 16. The deviations a are derived from a comparison of camera data from recorded measurements with reference data from a reference system 20. The reference system comprises high resolution sensors 21, e.g. a high resolution camera. The reference data comprise measurement data from the high resolution camera. The camera data and reference data are stored in a data base, e.g. a cloud memory or data farm. An evaluation logics unit 13, e.g. a computer, processor core, or a chip with a logic module, determines the difference between the camera data and the reference data and outputs this as the deviation a, see FIG. 13. This is how the measurement errors of the camera are recorded.

Deviations for other sensors 11 in the sensor system 10, e.g. radar and/or lidar, are obtained analogously according to the invention. The deviations a for lidar data are generated synthetically, for example. Data sheets of lidar sensors are used for the reference data in this case.

Deviations a between the sensor system 10 and the reference system 20 are also examined for different intensities of precipitation or different vehicle speeds according to the invention.

The data from the sensor system 10 comprise 50 recorded scenarios, for example, such as "stopping and going," with ca. 3 million data points.

Figure 2:
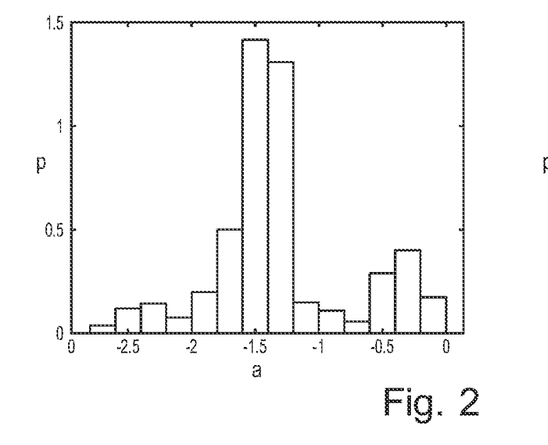
FIG. 2: shows a histogram of the distribution of the deviations of the camera data from FIG. 1.

The histogram in FIG. 2 is created from the deviations shown in FIG. 1. The histogram illustrates the occurrence probabilities p for the individual deviations a of the camera. Similar histograms are obtained analogously for other sensors 11 in the sensor system.

Figure 3:
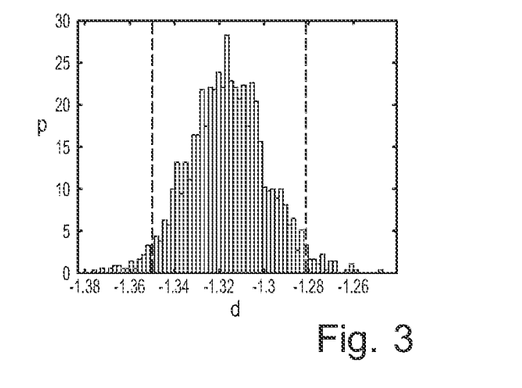
FIG. 3: shows a bootstrapping distribution of the mean value for the distribution of the camera data from FIG. 2.
Figure 4:
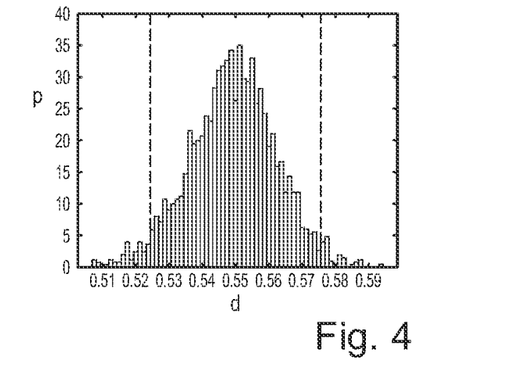
FIG. 4: shows the bootstrapping distribution of the standard deviation of the distribution of the camera data from FIG. 2.

The mean value and standard deviation for the deviations a are obtained from the bootstrapping of the deviations a of the camera data shown in FIGS. 3 and 4. Bootstrapping is carried out analogously for other sensors 11 in the sensor system 10. A number n of random samples are selected for the bootstrapping, and the mean value and standard deviation are calculated for each random sample. This results in the distribution of mean values shown in FIG. 3 and the standard deviation shown in FIG. 4.

Figure 5:
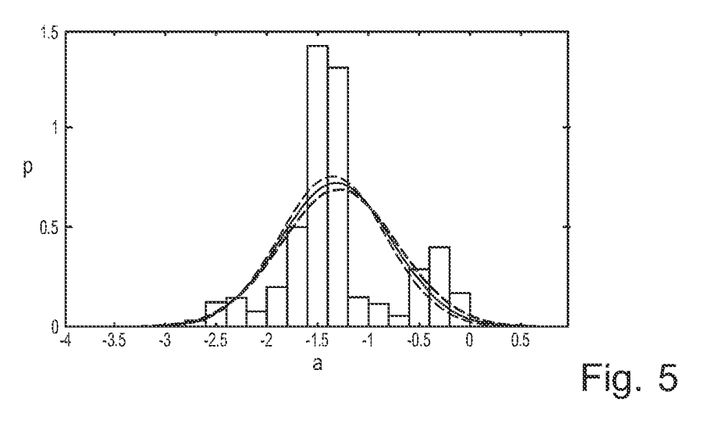
FIG. 5: shows fitted probability distribution deviations of the camera data from FIG. 2 with confidence limits from the mean value from FIG. 3 and standard deviation from FIG. 4.

The histogram in FIG. 2 is approximated with a probability distribution by means of the confidence interval limits obtained for the mean value, see FIG. 3, and the standard deviation, see FIG. 4. The resulting probability distribution for the deviations a of the camera data is shown in FIG. 5.

Figure 6:
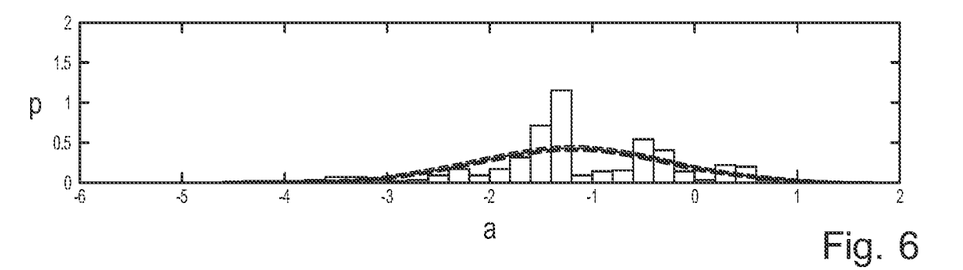
FIG. 6: shows a histogram of the distribution of deviations of further camera data and the fitted probability distribution of these deviations.
Figure 7:
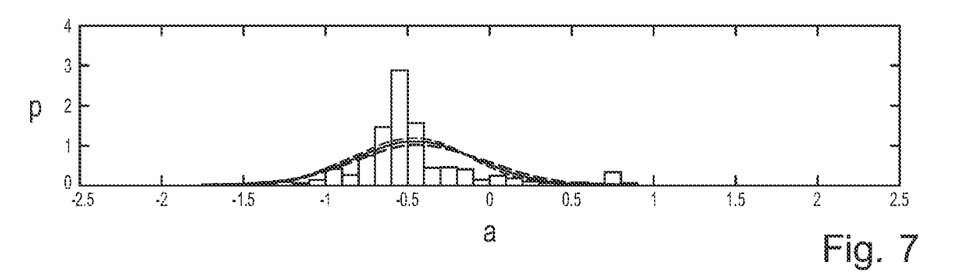
FIG. 7: shows a histogram of the distribution of deviations of radar data and a fitted probability distribution of these deviations.
Figure 8:
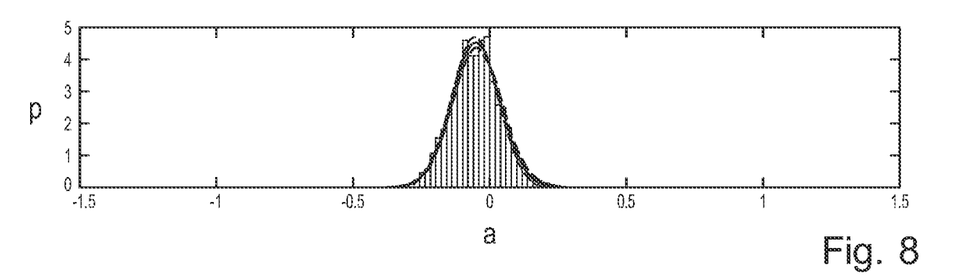
FIG. 8: shows a histogram of the distribution of synthetic deviations of lidar data and a fitted probability distribution of these deviations.

FIG. 6 shows another probability distribution for the deviations a of further camera data, FIG. 7 shows a probability distribution for the deviations a of radar data, and FIG. 8 shows a probability distribution for the deviations a of lidar data. FIG. 8 is based on synthetic deviations a of the lidar data, which are based on a data sheet that was used as the reference data for the lidar sensor.

Figure 9:
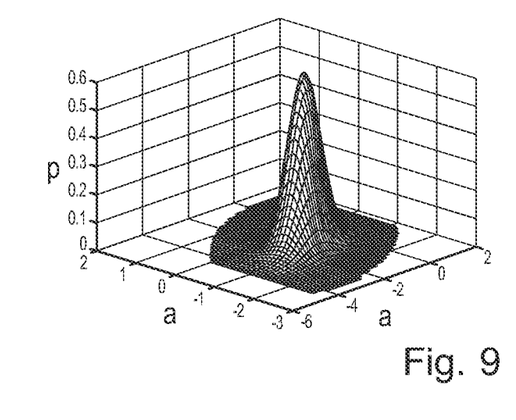
FIG. 9: shows a combined probability distribution of deviations of camera data and radar data for a predefined deviation of lidar data.

The combined probability distribution shown in FIG. 9 is a multidimensional probability distribution obtained from individual probability distributions of the deviations a of the camera, radar, and lidar data. The deviations a of the radar data are shown in FIG. 9 on the x-axis, the deviations a of the camera data are shown on the y-axis, and the combined probability distribution is shown on the z-axis. The combined probability distribution is shown for a fixed deviation a of the lidar data. A corresponding FIG. 9 is obtained for every deviation a of the lidar data. The combined probability distribution is obtained according to the invention in step V1 of the method.

Deviation combinations are sampled in step V2, and occurrence probabilities p are calculated for the sampled deviation combinations by means of the combined probability distribution. This generates critical error combinations. By way of example, error combinations are simulated in a simulation and/or reprocessing environment. The error effect is then evaluated by means of the combined probability distribution.

The reference data are then subjected to the sampled deviation combinations in a third step. These reference data are processed by a fusion unit 12 in the sensor system 10, and fusion results are obtained.

Figure 10:
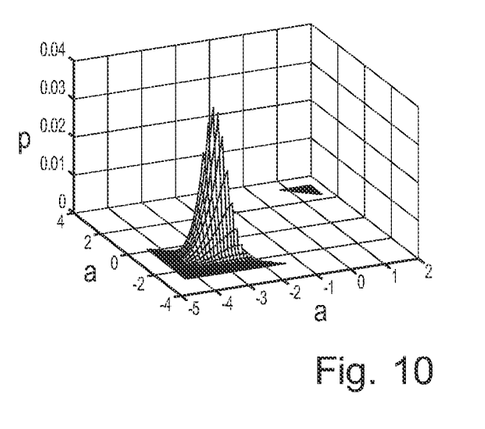
FIG. 10: shows the residual probability distribution of the combined probability distribution from FIG. 9.

The fusion results are evaluated with a limit state function in a fourth step V4 in order to remove the combined probability distribution of those occurrence probabilities p, from the fundamental deviation combinations of which such fusion results are obtained that satisfy a predefined condition. The result is the residual probability distribution shown in FIG. 10.

Figure 11:
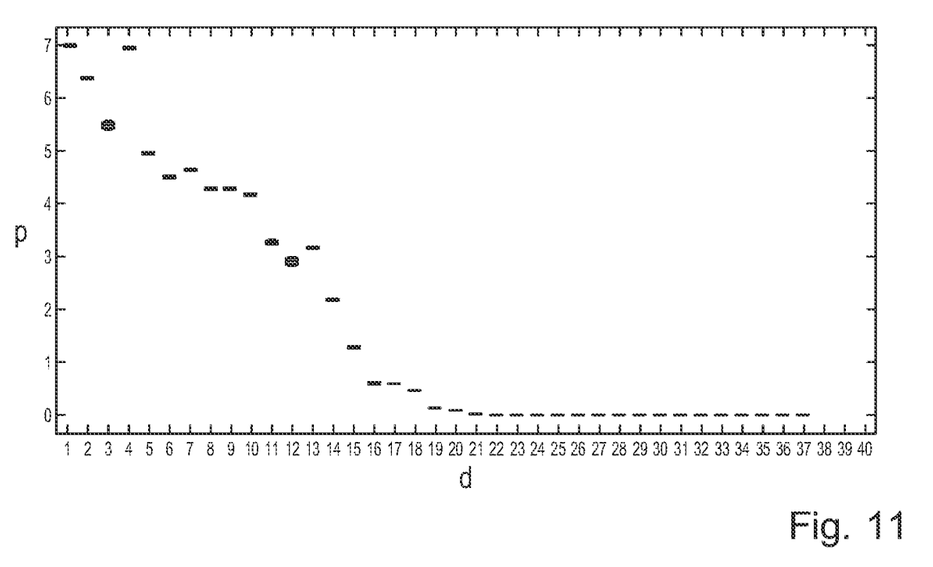
FIG. 11: shows, by means of trapezoid numerical integration, the integrated residual probability distribution with boxes indicating the width of the confidence interval.
Figure 12:
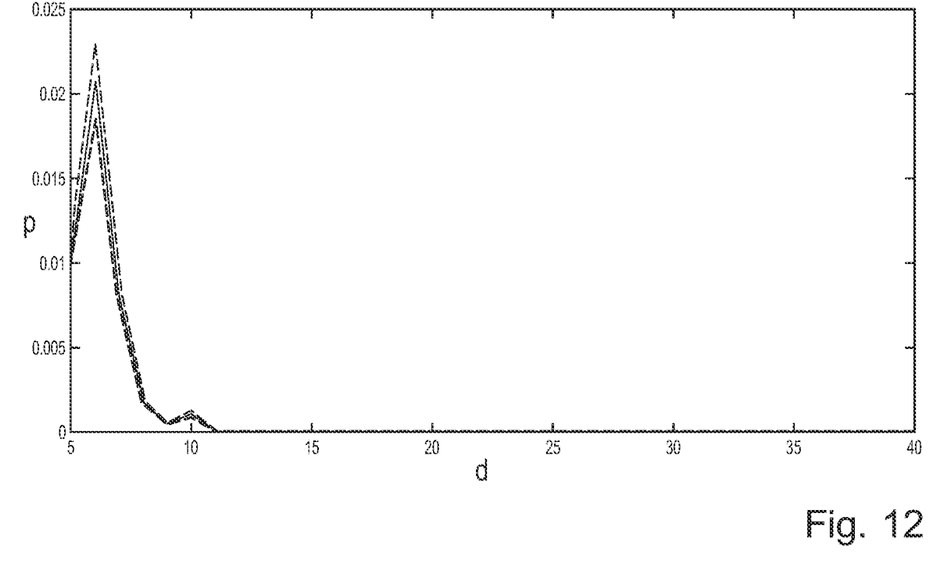
FIG. 12: shows the fitted absolute error probability with a lower and upper confidence.

The residual probability distribution is integrated in a fifth step V5, and an absolute error probability P is obtained, see FIGS. 11 and 12. The absolute error probability P is approximated, for example, by means of trapezoid numerical integration.

The sensor system 10 is approved in a sixth step V6 in a testing and approval process, depending on the absolute error probability P for the sensor system 10. The absolute error probability P forms a legitimization basis for the test base, i.e. the output data from the sensor system 10, the reference data, and the scenarios that are used. Because the 2 billion kilometers, or the equivalent thereof in driving time, currently required in the reference sources do not need to actually be driven, e.g. by the vehicle 1 and the sensor system 10 and reference system 20 mounted thereon, as a result of the examination of the individual error images, the legitimization of a small testing basis using the absolute error probability P enables approval of an autonomous vehicle technology.

Figure 13:
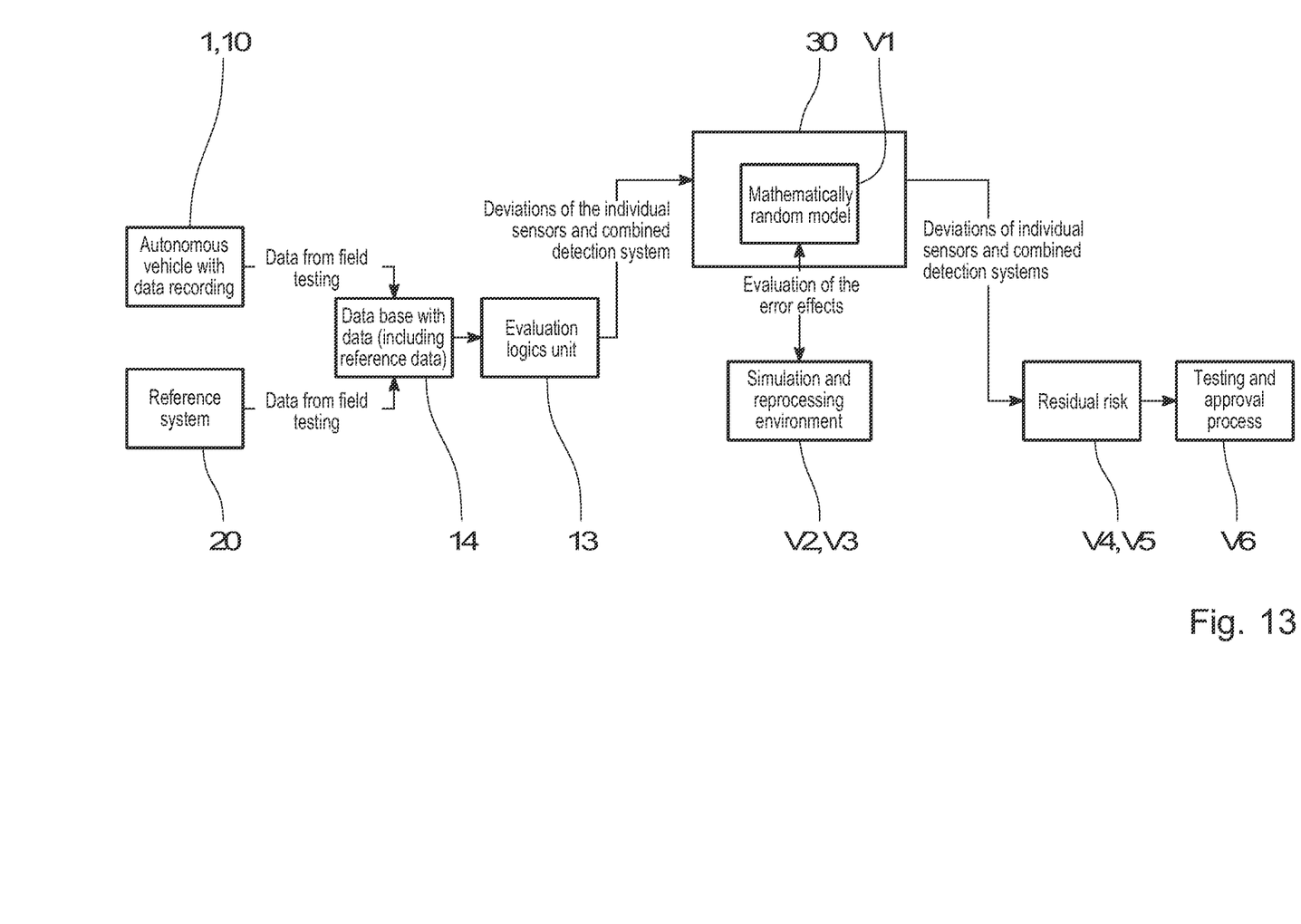
FIG. 13: shows an offline exemplary embodiment of a method according to the invention.

FIG. 13 shows an overview of the subject matter of the invention in an offline variation. The autonomous vehicle 1 is the people mover shown by way of example in FIG. 16. The mathematically random model comprises the probability distribution of the individual sensors 11 in the sensor system 10 and the resulting multidimensional combined probability distribution. The method according to the invention is carried out by the processor 30. The method steps V2 and V3 are carried out in a simulation and reprocessing environment, which can be part of the processor. The simulation environment is a software, by way of example, e.g. CarMaker. A prediction regarding residual risk is obtained in steps V4 and V6.

Figure 14:
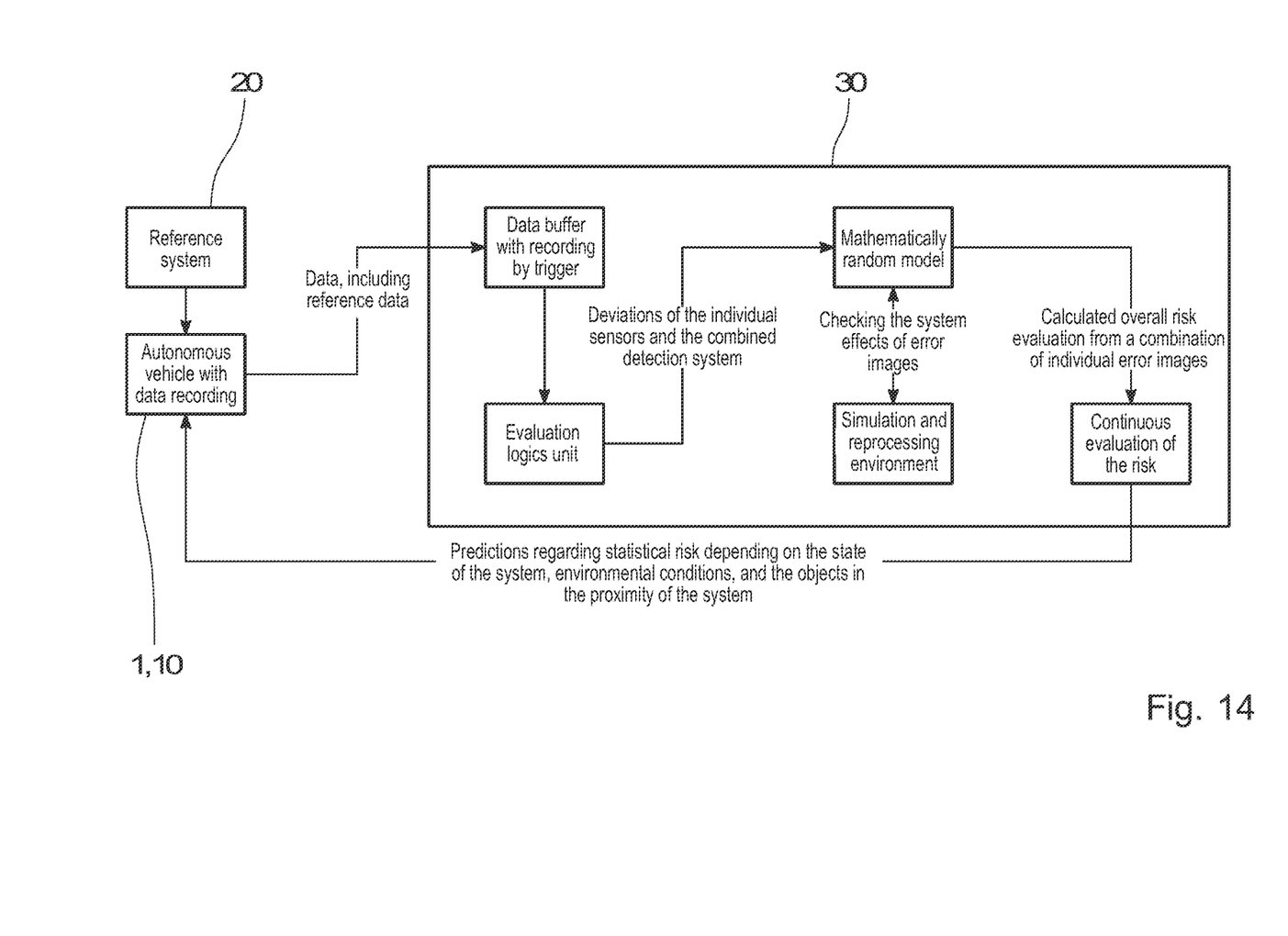
FIG. 14: shows an online exemplary embodiment of a method according to the invention.

FIG. 14 shows an overview of the subject matter of the invention in the online variation. Unlike in FIG. 13, the absolute error probability P is evaluated on a continuous basis and supplied as feedback to the driving strategy for the vehicle 1.

Figure 15:
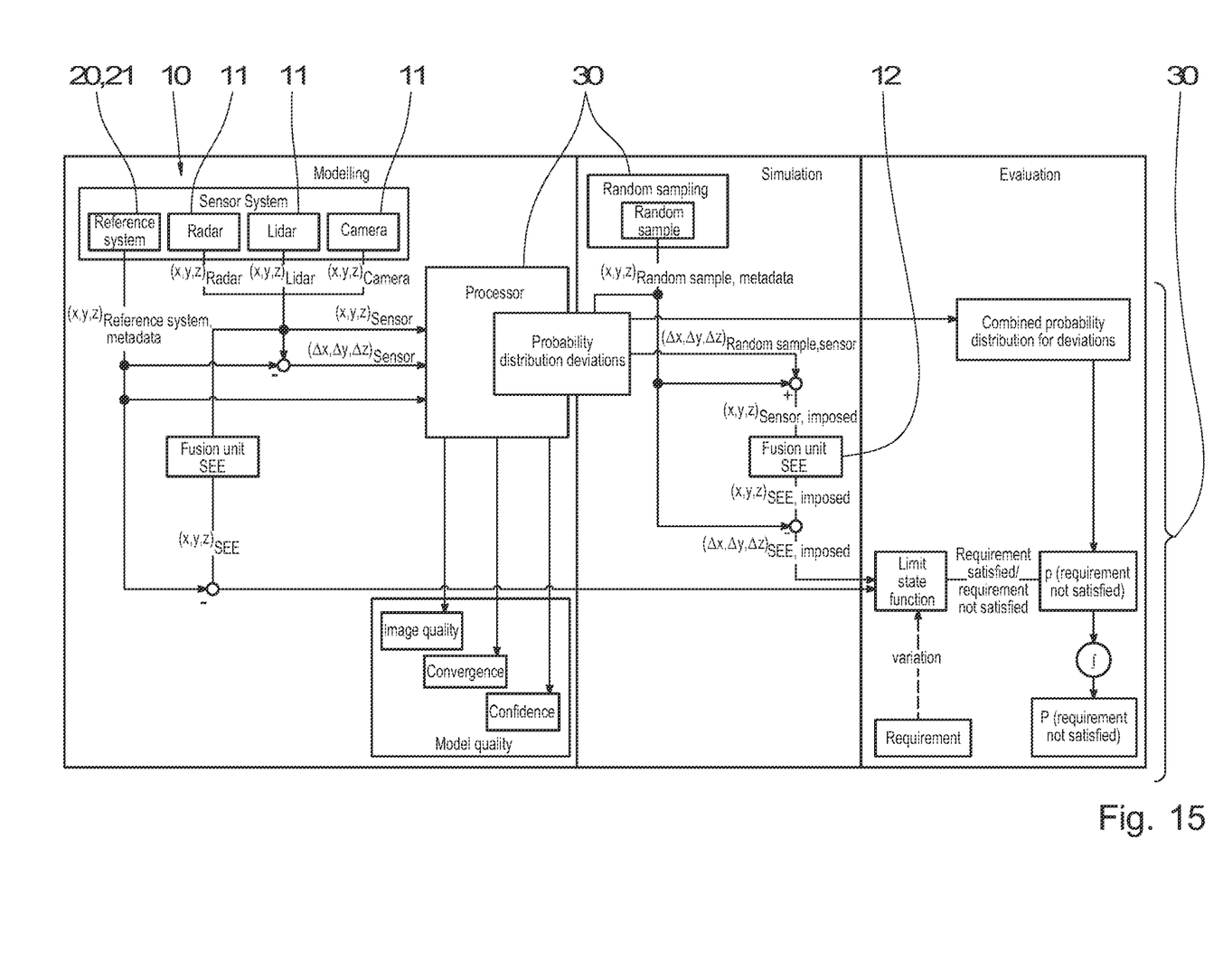
FIG. 15: shows the technical structure of an exemplary embodiment of an apparatus according to the invention.

FIG. 15 shows the technical structure of the processor 30 in the apparatus according to the invention. The core of the method, which is carried out by the processor 30, is obtaining the probability distributions for the deviations of the individual sensors 11, see FIGS. 6, 7, and 8, the resulting combined probability distribution, the sampling of deviation combinations, and obtaining the absolute error probability P. The data input for the processor 30 comprises the output data from the sensor system 10 and the reference data from the reference sensor system 20. The data output of the processor comprises the absolute error probability P.

Figure 16:
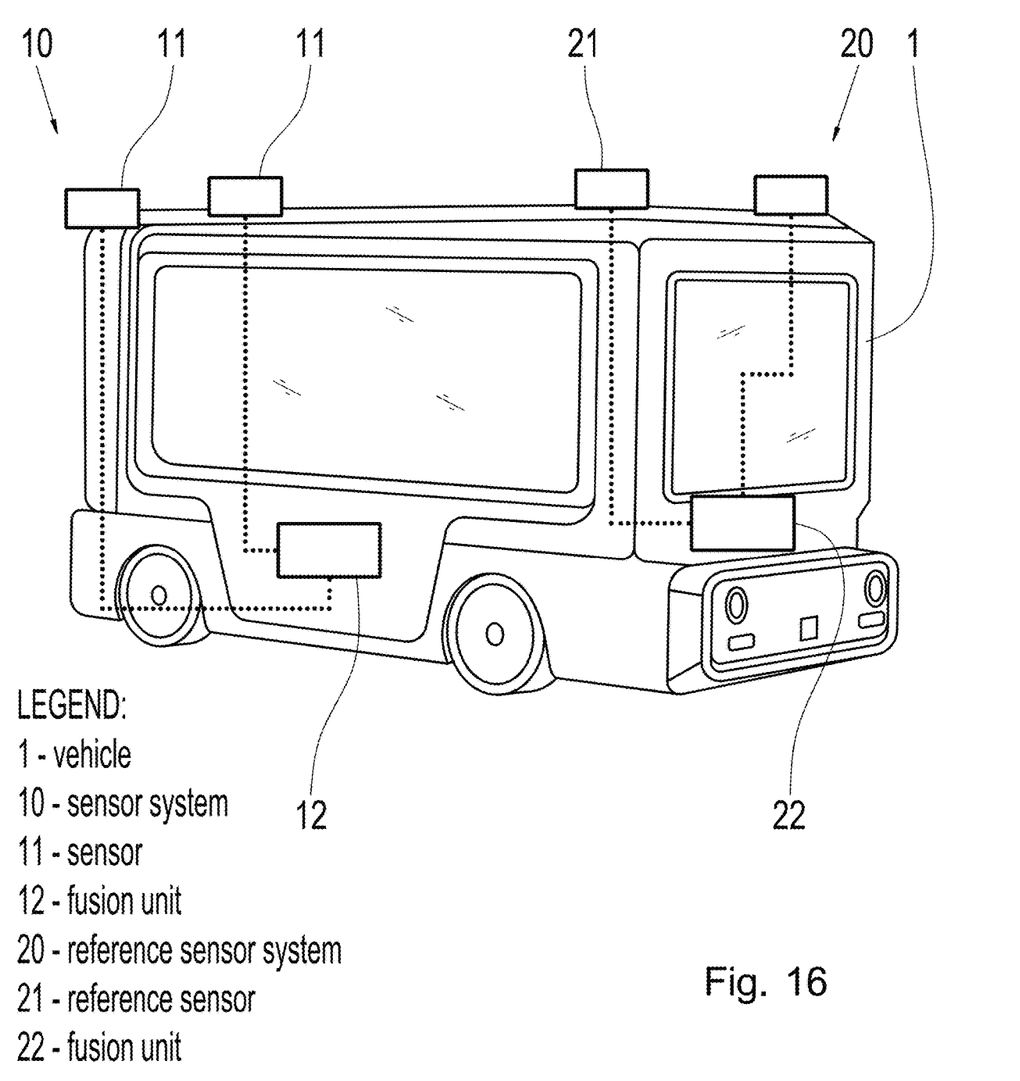
FIG. 16: shows an exemplary embodiment of a vehicle according to the invention.

The people mover in FIG. 16 is an example of a vehicle 1 according to the invention. The vehicle 1 comprises a sensor system 10 that contains numerous sensors 11. Only one of these sensors 11 is shown in FIG. 16, for purposes of clarity. The output data from the individual sensors 11 are combined in the fusion unit 12 in the sensor system 10. The vehicle 1 also comprises a reference sensor system 20 that contains numerous reference sensors 21. Only one reference sensor 21 is shown in FIG. 16, for purposes of clarity. The output data from the individual sensors 21 are combined in a fusion unit 22 in the reference sensor system 20.

The people mover in the form of an electric bus can comfortably accommodate 15 people. It does not take up any more surface area than a large limousine. As a result, it can be easily maneuvered in urban environments. The people mover has no emissions, offers various connectivity services, and can be driven in a highly automated manner. According to one aspect of the invention, the vehicle 1, e.g. the people mover, comprises a connectivity interface. A user can request the people mover as a shuttle in a flexible manner via an app, and is therefore not limited to rigid scheduling.

REFERENCE SYMBOLS 1 vehicle
10 sensor system
11 sensor
12 fusion unit
13 evaluation logics unit
14 data base
20 reference system
21 sensor
22 fusion unit
30 processor
V1-V6 method steps
p occurrence probability
P absolute error probability
d distance
a deviation

The invention claimed is:

1. A method for approving, relative to at least one safety standard, a sensor system for use in a vehicle for detecting objects in the vehicle's environment, the method comprising:
providing a combined probability distribution for deviations between output data from a sensor system and reference data at at least one of a programming level for detecting objects by the sensor system, a sensor level in the sensor system, or a fusion level in the sensor system;
sampling deviation combinations and calculating occurrence probabilities for the sampled deviation combinations by means of the combined probability distribution;
subjecting the reference data to the sampled deviation combinations, processing these reference data with a fusion unit in the sensor system, and obtaining fusion results;
removing those occurrence probabilities from the combined probability distribution from which the fusion results are obtained that satisfy a predefined condition, and obtaining a residual probability distribution;
taking an integral of the residual probability distribution and obtaining an absolute error probability; and
determining that the absolute error probability is acceptable in order, at least in part, to approve the sensor system for use in the vehicle.

2. The method according to claim 1, wherein the deviations between the output data from the sensor system and the reference data comprise at least one of deviations in distance measurements or deviations dependent on the weather or the state of the vehicle.

3. The method according to claim 1, wherein a probability distribution is provided for the deviations of each sensor in the sensor system and the deviation combinations are sampled by means of the individual probability distributions of the sensors.

4. The method according to claim 1, wherein the combined probability distribution is provided as a multidimensional standard deviation for the individual sensors in the sensor system.

5. The method according to claim 1, wherein the output data from the sensor system and the reference data are obtained while driving the vehicle, wherein the reference data comprise at least one of reference data recorded by a reference sensor system or reference data generated by means of sensor models.

6. The method according to claim 1, wherein the reference data are processed in at least one of Model in the Loop, Software in the Loop, or Hardware in the Loop simulations or with surrogate models.

7. The method according to claim 1, wherein the fusion results are obtained using a redundancy in the sensor system.

8. The method according to claim 1, wherein deviations between the fusion results and the reference data are evaluated using a limit state function in order to remove the occurrence probabilities from the probability distribution.

9. The method according to claim 1, wherein amounts of output data and amounts of reference data are increased incrementally.

10. An apparatus for approving a sensor system for detecting objects in a vehicle's environment, comprising at least one processor configured to execute the steps of the method according to claim 1.

11. A sensor system for detecting objects in a vehicle's environment, comprising a plurality of sensors using at least one specific sensor technology, and the apparatus according to claim 10.

12. A vehicle comprising:
the sensor system according to claim 11;
at least one control unit;
actuators, wherein the sensor system, the control unit, and the actuators are connected for signal transmission, such that the vehicle is configured to drive at least partially autonomously; and
an interface for at least one reference system;
wherein the absolute error probability is obtained while driving the vehicle, and the error probability is supplied as feedback to a driving strategy for the vehicle.

13. A non-transitory computer readable medium having stored thereon commands for approving a sensor system for detecting objects in a vehicle's environment, wherein the commands, when executed a at least one processor, execute the method according to claim 1.

* * * * *